Patented Jan. 30, 1940

2,188,344

UNITED STATES PATENT OFFICE 2,188,344

POLYVINYL ACETAL RESINS AND A PROCESS FOR THE PREPARATION THEREOF

Charles R. Fordyce, Rochester, N. Y., assignor, by mesne assignments, to Eastman Kodak Company, Rochester, N. Y., a corporation of New Jersey No Drawing. Application February 3, 1936, Serial No. 62,230

6 Claims. (Cl. 260—73)

This invention relates to polyvinyl acetal resins and more particularly to polyvinyl acetal resins prepared from a partially hydrolyzed polyvinyl ester and an aldehyde, the finished resin containing but a small or practically no ester group content.

It is known, for instance in British patent 351,082, that polyvinyl esters, for example, polyvinyl acetate can be simultaneously hydrolyzed and condensed with an aldehyde, in the presence of an acid catalyst, to give polyvinyl acetal-acetate resins. The preparation of a polyvinyl acetal resin, substantially devoid of ester groups, by this method has proven impractical. Now, I have found that polyvinyl-acetal-ester resins can be deesterified yielding polyvinyl acetal resins substantially devoid of ester groups. Such new resins contain a larger hydroxyl group content. This larger hydroxyl group content, I have found, is advantageous. Resins prepared according to my new process have unusual properties as respects flexibility of sheets formed therefrom, higher softening points, ease of coating into sheets from suitable solvents, toughness and elasticity of the products, particularly sheets, formed therefrom. Furthermore resins prepared by my new process when plasticized with suitable plasticizers form more elastic, tougher, more rubber-like materials which properties are especially advantageous in the manufacture of laminated safety glass.

The method in which the ester-group-free resins of my invention can be produced is by the deesterification of resins such as are produced in British Patent 351,082. Such a deesterification can be accomplished by treatment of the aforesaid resins with alkalies under suitable conditions as hereinafter described. Such a deesterification can also be produced by treatment of the aforesaid polyvinyl-acetal-ester resins with primary or secondary alcohols, preferably the former, under suitably controlled conditions as hereinafter described.

In practicing my new process, the polyvinyl-acetal-esters used need not be limited to the polyvinyl-acetal-acetate resins described in British Patent 351,082. Polyvinyl-acetal-propionate or polyvinyl-acetal-butyrate or the like can also be used. The acetal groups can correspond to any compound having a reactive carbonyl group, such as formaldehyde, acetaldehyde, propionaldehyde, butyraldehyde, crotonaldehyde, cyclohexanone and the like. Various of such different polyvinyl-acetal-esters are described in British Patent 403,-750 and U. S. Patent 1,933,986. More than one kind of ester group can be present in the polyvinyl-acetal-ester resins used. Such resins are described, for instance, in U. S. Patent 1,939,422. More than one kind of acetal group can be present in the polyvinyl-acetal-ester resins employed. Such resins are described, for instance, in a copending application of J. G. McNally and R. H. Van Dyke, Serial No. 47,472, filed October 30, 1935. The polyvinyl-acetal-ester resins employed need not be isolated from the reaction mixture in which they are prepared, although it is preferable to do so if this reaction mixture contains a large quantity of an acid.

The foregoing description of my invention will be more apparent from a perusal of the following examples which are set forth merely to illustrate and are in no way intended as limitations thereon.

*Example 1.*—To a solution of 100 parts of a polyvinyl acetal-acetate resin in 400 parts of ethyl alcohol (95%) was added, with stirring, a solution of 10 parts of potassium hydroxide in 100 parts of ethyl alcohol (95%). The resulting solution was allowed to stand for 24 hours at 70° C. The resin was then precipitated by pouring the solution into a large volume of water and the product washed until free from alkali and dried. Analysis of the washed and dried resin gave an acetate group content equivalent to about 0.5% by weight of polyvinyl acetate and a hydroxyl group content equivalent to about 17% by weight of polyvinyl alcohol. The starting resin contained an acetate group content equivalent to about 12% by weight of polyvinyl acetate and a hydroxyl group content equivalent to about 9% by weight of polyvinyl alcohol.

*Example 2.*—A solution of 100 parts of a polyvinyl acetal-ester resin in 500 parts of pyridine was prepared and to the solution was added 200 g. of a 10% aqueous sodium hydroxide solution. The resulting mixture was held at 40° C. for 12 hours. The resin was then precipitated in water, washed and dried. Upon analysis, it was found to contain an acetate group content equivalent to 1.2% by weight of polyvinyl acetate and a hydroxyl group content equivalent to about 13.1% by weight of polyvinyl alcohol.

*Example 3.*—A polyvinyl acetal resin was prepared by heating a solution of 10 parts of polyvinyl acetate, 8 parts of ethyl acetate, 10 parts of ethyl alcohol, 5 parts of paraldehyde, 1 part of sulfuric acid, and 1 part of water for 7 hours at 70° C. A sample of the resin was precipitated and found to have an acetate group content equivalent to about 9% by weight of polyvinyl acetate and hydroxyl group content equivalent to about 8% by weight of polyvinyl alcohol. Continued digestion of the reaction mixture had little or no effect on the acetate group content. Upon adding 10 further parts of ethyl alcohol and heating for 5 hours longer at 70° C., however, a resin was obtained which had an acetate group content equivalent to about 2% by weight of polyvinyl acetate and a hydroxyl group content equivalent to about 12% by weight of polyvinyl alcohol.

*Example 4.*—A reaction mixture consisting of 150 parts of polyvinyl acetate, 238 parts of 95% ethyl alcohol, 40 parts of ethyl acetate, 48 parts of paraldehyde, 18 parts of sulfuric acid, and 21 parts of water was heated at 70° C. for 24 hours. The resulting resin was precipitated by pouring the solution into a large volume of water. It then was washed with water until free from acid and then dried. It was found to have an acetate group content equivalent to about 2.2% polyvinyl acetate and a hydroxyl group content equivalent to about 11.4% polyvinyl alcohol. In this example, preparation of the polyvinyl-acetal-acetate resin was combined with the deacetylation reaction so that the resulting final resin possesses a low acetate group content. The ratio of parts of ethyl alcohol to paraldehyde is nearly 5 to 1 or greater. In deesterification as carried out in this example, I have found best results are obtained when the molecular ratio of alcohol to aldehyde (in the case at hand ethyl alcohol to acetaldehyde) is at least 3 to 1 and preferably about 5 to 1. In this example, polyvinyl acetate can be replaced by polyvinyl propionate, polyvinyl butyrate or the like. Paraldehyde can be replaced by paraformaldehyde, acetaldehyde, butyraldehyde, cyclohexanone and the like. The 95% ethyl alcohol can be replaced by absolute ethyl alcohol, by methyl alcohol, by n-propyl alcohol, by n-butyl alcohol or the like. Isopropyl alcohol can be used though less satisfactorily. Ethyl acetate can be replaced by n-propylacetate, acetone or the like. Sulfuric acid can be replaced by other similarly acting acid catalytic agents, such as hydrochloric or phosphoric acids.

In Examples 1, 2 and 3, the ethyl alcohol can be replaced with methyl alcohol, n-propyl alcohol or the like and, the ethyl acetate by n-propyl acetate and the like. Potassium hydroxide can be replaced with any strongly basic substance such as sodium hydroxide, potassium carbonate (which is known to hydrolyze in aqueous media to give potassium hydroxide) or the like. Sulfuric acid can be replaced by hydrochloric acid.

The temperatures employed in Examples 1 and 2 can be varied from room temperature to 70° C. or higher. However, higher temperatures cause the resin produced to be darker in color. Temperatures around 30° to 40° C. are preferable. In Examples 3 and 4, the temperatures employed are preferably about 70° C. However, lower or higher temperatures can be employed.

In all these resins those of higher molecular weight are preferable. Accordingly, in making the products for deesterification, in accordance with the procedure given in British Patent 351,082 for example, it is desirable to employ polyvinyl esters of higher molecular weight. For instance polyvinyl acetate, the viscosity of which in 10 percent solution in benzene at 25° C. is 15, 30, 45 or higher centipoises, is desirable.

Deesterifications similar to those illustrated in the above examples can be produced with polyvinyl-acetal-propionate resins, polyvinyl-acetal-butyrate-resins and the like. Also, in a similar manner polyvinyl-formaldehyde-acetal-ester resins, polyvinyl-butyraldehyde-acetal-ester resins, polyvinyl-acetbutyraldehyde-acetal-ester resins and the like can be deesterified.

While I have found that in general a deesterified resin has improved properties and that those having an ester group content equivalent to less than three percent by weight of polyvinyl ester are generally desirable, I have also found that the most unusual resins of all are obtained by deesterification of such of the aforementioned prior known types of resins as will result in a resin substantially free from ester groups (less than 3% by weight of polyvinyl ester) and obtaining a hydroxyl group content equivalent to from about 10% to about 20% by weight of polyvinyl alcohol. Also in accordance with my findings, I have discovered that higher hydroxyl group contents can be tolerated in resins having higher molecular weight acetal groups without loss of satisfactory properties. In other words, where the resin contains a cyclohexanone or a butyraldehyde acetal group a hydroxyl group content equivalent to as much as 20% by weight of polyvinyl alcohol can be tolerated without loss of satisfactory properties, such as solubility in organic solvents. Where the resin is substantially free from ester groups and contains exclusively lower molecular weight acetal groups, such as acetaldehyde acetal groups, a hydroxyl group content equivalent to 15%–17% by weight of polyvinyl alcohol can be tolerated without loss of satisfactory properties.

The resins of my invention are not to be confused with the more or less indefinite and incomplete references in the prior art to resins produced by the condensation of polyvinyl alcohol with aldehydes inasmuch as examination of these resins has disclosed none which can be used to produce products having the unusual properties found in my new resins produced by deesterification.

Many of my new resins possess unusually good properties for the manufacture of film or sheet therefrom. For example, a deacetylated polyvinyl acetaldehyde acetal resin containing an acetate group content equivalent to about 1.2% by weight of polyvinyl acetate and a hydroxyl group content equivalent to about 13.1% by weight of polyvinyl alcohol, can be coated from a solution of methyl alcohol, methyl alcohol and acetone, or methyl alcohol and methyl acetate to give a transparent sheet or film characterized, among sheets from resins, by satisfactory flexibility and by satisfactory moisture susceptibility. Such a resin as this one just described is an improvement over the polyvinyl-acetaldehyde-acetal-acetate resins described in the copending application of R. H. Talbot, Serial No. 28,876, filed June 28, 1935, insofar as manufacture of transparent film or sheet is concerned, in that my new resins are much more adapted to coating from solutions of organic solvents. Transparent films or sheets made from my new resins strip more easily from the coating surface and show a much greater rigidity during curing, no stretching or "necking down" occurring. In general, I have found that polyvinyl acetaldehyde acetal resins containing an acetate group content equivalent to less than 3% by weight of polyvinyl acetate and a hydroxyl group content equivalent to from about 10% to about 17% by weight of polyvinyl alcohol, and particularly such resins when prepared by my deesterification process, make high-grade transparent film or sheet, such as is intended for wrapping purposes and particularly as is intended for a support for photographic emulsions, such as gelatino-silver-halide emulsions. The other resins described herein can be used for the same purposes, but the group just described are outstanding.

The herein described resins are compatible with many plasticizers, such as tricresyl phosphate, tributyl phosphate, tribromophenol, diamyl phthalate, dibutyl phthalate, di- and triglyceryl esters such as acetates, propionates, butyrates and the like, glycerol acetal esters, such as the butyraldehyde acetal of glyceryl monoacetate, monobutyrate, monovalerate or the like, glycerol acetal ethers, such as the acetaldehyde acetal of glycerol monoethyl ether or dodecylether, monochloronaphthalene and the like. With certain of these new resins produced by deesterification very unusual tough, rubbery sheets can be obtained by plasticization. This is particularly the case with those resins containing a hydroxyl group content equivalent to from about 15% to about 20% by weight of polyvinyl alcohol.

The herein described resins can be extruded in the form of sheets or plates and can be otherwise molded in known manners.

What I claim and desire to be secured by Letters Patent of the United States is:

1. A process for the preparation of a polyvinyl acetal resin comprising deacetylating, in the presence of an alkali metal hydroxide, a polyvinyl acetal-acetate resin.

2. A process for the preparation of a polyvinyl acetal resin comprising deacetylating, in the presence of sodium hydroxide, a polyvinyl acetal-acetate resin.

3. A process for the preparation of a polyvinyl acetal resin comprising deacetylating, in the presence of sodium hydroxide and pyridine, a polyvinyl acetal-acetate resin.

4. A process for the preparation of a polyvinyl acetal resin comprising deacetylating, in the presence of an alkali metal hydroxide, a polyvinyl acetaldehyde acetal-acetate resin.

5. A process for the preparation of a polyvinyl acetal resin comprising deacetylating, in the presence of an alkali metal hydroxide, a polyvinyl butyraldehyde acetal-acetate resin.

6. A process for the preparation of a polyvinyl acetal resin comprising deacetylating, in the presence of an alkali metal hydroxide, a polyvinyl formaldehyde acetal-acetate resin.

CHARLES R. FORDYCE.